United States Patent Office 3,271,189
Patented Sept. 6, 1966

---

3,271,189
PROCESS OF TREATING SYNTHETIC FIBERS
Hugo Hofmann, Elizabethton, Tenn., assignor to Beaunit Corporation, a corporation of New York
No Drawing. Filed Mar. 2, 1962, Ser. No. 176,891
2 Claims. (Cl. 117—138.8)

This invention relates to a process of treating polyester staple fiber with polysiloxane to impart substantially permanent high resiliency thereto and the product thereof.

Suitable filling for pillows, comforts, sleeping bags, etc. must be highly resilient and non-allergenic; and for such reasons crimped staple fiber produced from linear, fiber forming polyesters such as polyethylene terephthalate and copolymers of polyethylene terephthalate/isophthalate, etc., have been marketed as substitutes for natural down. Nevertheless, polyester fiberfill loses its initial springiness and liveliness, i.e., resiliency, quickly. Thus it becomes lifeless and tends to matt under repeated compression.

It is the principal object of this invention to provide a modified polyester fiberfill of increased, substantially permanent resiliency.

Unexpectedly, I have found that conventional polyester fiberfill upon treatment with a cross-linkable mixture of methylhydrogenpolysiloxane and methylpolysiloxane followed by heat curing acquires a high, substantially permanent resiliency in comparison with the untreated fiberfill.

Although I am well aware that the organosiloxane polymers used in practicing the present invention have heretofore been employed for waterproofing fabrics, nevertheless, I have found unexpectedly that certain silicon polymers will impart high and substantially permanent resiliency to polyester staple fiber treated therewith. Organosiloxane polymers which may be used in practicing this invention are disclosed, for example, in United States Letters Patent Nos. 2,588,365 and 2,588,366 to Dennett of Mar. 11, 1952.

These polymers have the recurring silicon-oxygen-silicon links —Si—O—[Si—O—]$_n$ with the other attached groups consisting of hydrogen atoms and methyl radicals One of the polymers used is a methylhydrogenpolysiloxane fluid which contains between 1.0 and 1.5 methyl radicals and between 0.75 and 1.25 hydrogen atoms bonded to silicon per silicon atom, there being a total of 2 to 2.25 methyl radicals and hydrogen atoms per silicon atom. Fluids of this type may be produced by the hydrolysis and condensation of $(CH_3)_3SiCl$, $(CH_3)_2HSiCl$, and $(CH_3)_2SiCl_2$. These fluids have the general formula $$(CH_3)_aH_bSiO_{4-a-b/2}$$

where $a$ has a value of from 1.0 to 1.5, $b$ has a value of from 0.75 to 1.25, and the sum of $a$ and $b$ has a value of from 2.0 to 2.25 inclusive. They may be produced by cohydrolyzing and condensing a mixture of methyl chlorosilanes of the general average formula $$(CH_3)_nSiCl_{4-n}$$

where $n$ has a value of from 2 to 2.1.

Methylpolysiloxane fluids containing between 2 and 2.1 methyl radicals per silicon atom and having a viscosity of at least 1,000 centistokes and preferably less than 100,000 centistokes; and methylpolysiloxane resins of the general formula $$(CH_3)_xSiO_{4-x/2}$$

where $x$ has a value of from 1.0 to 1.25 are blended either singly or in combination with the above methylhydrogenpolysiloxane polymer. They may be prepared by methods such as those disclosed in U.S. Patent No. 2,486,162.

In practicing the invention I prefer to use a prepared emulsion of 40 percent high polymeric siloxanes which is sold under the trademark "DC-104" by the Dow Corning Corporation, Midland, Michigan. This emulsion is preferably mixed with about 20 percent (based on the weight of the emulsion) of a catalyst such as zinc octoate sold by Dow Corning under the trademark "DC Catalyst 21," and the mixture is diluted with water to the desired concentration for application to the crimped fibers.

Another suitable siloxane polymer is a viscous, high polymeric silicon composition supplied in a concentration of about 65 percent solids by weight in dissolved form under the trademark "DeCetex 104" by Dow Corning Corporation. This polymer may be applied from an oil-in-water emulsion or from a solution prepared with hydrocarbon or chlorinated solvents. When a water emulsion is utilized, a small amount of a cationic heat decomposable onium compound, such a cetyl dimethyl benzyl ammonium chloride sold by Onyx Oil Company under the trademark "Ammonyx T" as a 25% aqueous solution is preferably added as an emulsifying agent. Other polymers in the "DC" and "DeCetex" series, viz, "DC-102" and "DeCetex 102" may also be used. The application of the dilute emulsion or solution to the fibers may be accomplished in any conventional manner, such as padding or quetching. Drying and curing is effected by heating the coated fibers to a temperature ranging from about 100° F. to 475° F. for a period of five seconds or more. I have found that curing periods up to 24 hours or more increase the resiliency of the treated fiberfill, and the optimum temperature and duration of the curing for a given fiber can be determined by simple experimentation.

The term fiberfill covers short, loose, crimped, etc. fibers for use as a filler for articles of manufacture such as pillows, upholstery, etc. For example, fiberfill may be produced by cutting, shredding, or tearing the crimped polyester tow into short lengths.

The following examples are given to illustrate the invention without limitation.

*Example I*

Six denier crimped tow of polyethylene terephthalate polyester, sold by E. I. du Pont de Nemours & Co. under the trademark "Dacron" and produced by processes disclosed in U.S. Patent No. 2,465,319 to Whinfield, was padded with a bath composed of 600 grams of "DC-104" prepared emulsion, and 120 grams of "DC Catalyst 21" in ten liters of water. The tow was dried for two hours at 220° F. and cured for two hours at 270° F. The tow was then cut into two inch lengths and carded to form fiberfill having greatly improved resiliency in comparison with the unmodified polyester fiberfill.

*Example II*

4.5 denier crimped tow of a copolyester of 30/70 isophthalate and terephthalate, which is sold by Beaunit Mills, Inc., under the trademark "Vycron" and produced by the processes disclosed in U.S. Patent No. 2,965,613 to Millone et al., was padded with a bath composed of 850 grams of "DeCetex 102" and 25.5 grams of "Ammonyx T" in 10 liters of water. The tow was dried at 220° F. for one hour and cured for one hour at 270° F. The tow was cut into two inch lengths and carded to form fiberfill having greatly improved resiliency in comparison with the unmodified polyester fiberfill.

*Example III*

4.5 denier "Vycron" crimped tow was padded with a bath composed of 300 grams of "DC-104" prepared emulsion and 60 grams of "DC Catalyst 21" in 10 liters of water. The tow was dried for two hours at 220° F. and cured for two hours at 270° F. The tow was cut into two inch lengths and carded to form fiberfill having greatly improved resiliency.

*Example IV*

4.5 denier "Vycron" crimped tow was padded with a solution of 25 percent "DeCetex 104" in "Varsol," a petroleum naphtha solvent, sold by Humble Oil & Refining Co. The tow was dried for two hours at 220° F. and cured for two hours at 270° F. The tow was cut into two inch lengths and carded to form fiberfill having greatly improved resiliency.

*Example V*

4.5 denier "Vycron" crimped tow was padded with a solution of 600 grams "DeCetex 104" and 18 grams "Ammonyx T" in 10 liters of water. The tow was dried for two hours at 220° F. and cured for two hours at 270° F. The tow was cut into two inch lengths and carded to form fiberfill having greatly improved resiliency.

Although it is possible to treat the crimped polyester fiberfill, I prefer to treat the crimped tow before the cutting operation.

I have further found that the carding or garnetting operation is greatly facilitated by adding a small amount of an antistatic agent to the siloxane emulsion or solution bath.

The siloxane emulsion or solution may contain any desired quantity of siloxane polymer solids; however, I have found for reasons of economy that solutions or emulsions containing in excess of about three percent siloxane polymers can be dispensed with.

Changes in the details of the processes set forth above will be recognized readily by those skilled in the art, and for that reason it is intended to cover all modifications and variations coming within the scope of the appended claims.

I claim:

1. As a new article of manufacture, polyester fiberfill with high, substantially permanent resiliency comprising crimped polyester fiberfill having a thin, solid coating of a methylpolysiloxane polymer cross-linked with a methylhydrogenpolysiloxane polymer.

2. As a new article of manufacture, polyester fiberfill with high, substantially permanent resiliency comprising crimped polyester fiberfill having a thin, solid coating of a methylpolysiloxane polymer cross-linked with a methylhydrogenpolysiloxane polymer, said polymer coating amounting to about one percent by weight based upon the weight of said polyester fiberfill.

References Cited by the Examiner

UNITED STATES PATENTS

| | | |
|---|---|---|
| 2,588,365 | 3/1952 | Dennet. |
| 2,588,366 | 3/1952 | Dennet. |
| 2,604,689 | 7/1952 | Hebeler _____ 264—168 |
| 2,660,736 | 12/1953 | Biefeld. |
| 2,914,836 | 12/1959 | Montgomery. |

WILLIAM D. MARTIN, *Primary Examiner.*

RICHARD D. NEVIUS, *Examiner.*

A. R. NAVARO, T. G. DAVIS, *Assistant Examiners.*